(12) United States Patent
Jiang

(10) Patent No.: US 11,456,963 B2
(45) Date of Patent: Sep. 27, 2022

(54) METHOD, DEVICE AND SYSTEM FOR DISCARDING DATA PACKET

(71) Applicant: Beijing Xiaomi Mobile Software Co., Ltd., Beijing (CN)

(72) Inventor: Xiaowei Jiang, Beijing (CN)

(73) Assignee: Koninklijke Philips N.V., Eindhoven (NL)

(*) Notice: Subject to any disclaimer, the term of this patent is extended or adjusted under 35 U.S.C. 154(b) by 244 days.

(21) Appl. No.: 16/618,263

(22) PCT Filed: Jul. 25, 2017

(86) PCT No.: PCT/CN2017/094359
§ 371 (c)(1),
(2) Date: Nov. 29, 2019

(87) PCT Pub. No.: WO2019/019025
PCT Pub. Date: Jan. 31, 2019

(65) Prior Publication Data
US 2020/0153746 A1 May 14, 2020

(51) Int. Cl.
*H04L 12/823* (2013.01)
*H04W 28/06* (2009.01)
*H04W 24/02* (2009.01)
*H04L 47/32* (2022.01)

(52) U.S. Cl.
CPC ............. *H04L 47/32* (2013.01); *H04W 24/02* (2013.01); *H04W 28/06* (2013.01)

(58) Field of Classification Search
CPC ........ H04L 47/32; H04W 24/02; H04W 28/06
USPC ......................................................... 370/230
See application file for complete search history.

(56) References Cited

U.S. PATENT DOCUMENTS

2020/0068427 A1* 2/2020 Turtinen ............... H04W 28/06

FOREIGN PATENT DOCUMENTS

| CN | 103167553 A | 6/2013 |
|---|---|---|
| CN | 103503511 A | 1/2014 |
| CN | 103826260 A | 5/2014 |
| CN | 106027211 A | 10/2016 |
| CN | 106921996 A | 7/2017 |
| EP | 2 790 437 A1 | 10/2014 |
| EP | 2 999 296 A1 | 3/2016 |
| WO | WO 2009/045945 * | 4/2009 |
| WO | WO 2009/086679 A1 | 7/2009 |

OTHER PUBLICATIONS

Extended European Search Report in European Application No. 17919487.3, dated Dec. 3, 2020.

(Continued)

*Primary Examiner* — Gbemileke J Onamuti

(57) ABSTRACT

A method for discarding a data packet includes: receiving an instruction message sent by a base station, the instruction message instructing start of monitoring transmission timeout of a data packet in an SDAP layer; when detecting that a target session is initiated, starting, according to the instruction message, a packet discarding timer corresponding to each data packet in a data stream of the target session in the SDAP layer; and when the packet discarding timer expires and it is detected that the data packet corresponding to the packet discarding timer fails to be transmitted, discarding the data packet corresponding to the packet discarding timer.

8 Claims, 10 Drawing Sheets

(56) References Cited

OTHER PUBLICATIONS

English version of International Search Report in Application No. PCT/CN2017/094359, from the State Intellectual Property Office of the P.R. China, dated Apr. 18, 2018.
Office Action of Chinese Application No. 201780000682.8, dated Sep. 21, 2020.
LG Electronics Inc., "QoS flow to DRB remapping", 3GPP TSG-RAN WG2 NR Ad Hoc #2, R2-1706815, Qingdao, China, Jun. 27-29, 2017, 3 pages.

* cited by examiner

METHOD, DEVICE AND SYSTEM FOR DISCARDING DATA PACKET

CROSS REFERENCE TO RELATED APPLICATIONS

This application is a national phase application based on PCT/CN2017/094359, filed Jul. 25, 2017, the content of which is incorporated herein by reference.

TECHNICAL FIELD

The present disclosure generally relates to communications technologies, and more particularly, to a method, device and system for discarding a data packet.

BACKGROUND

With the development of technology, the application and popularization of the 5th-Generation (5G) mobile communication technology has become very clear. The 5G technology is a continuation of the 4th-Generation (4G) mobile communication technology: the communication process is divided into a user plane and a control plane. The user plane mainly comprises three sub-layers, which are a Packet Data Convergence Protocol (PDCP) layer, a Radio Link Control (RLC) layer and a Media Access Control (MAC) layer from top to bottom. With the in-depth study of the 5G technology, in addition to the above-described three sub-layers, a new sub-layer, i.e., a Service Data Adaptation Protocol (SDAP) layer, is introduced above the PDCP layer. In the SDAP layer, one of the important tasks is to perform mapping between a data stream and a Data Radio Bearer (DRB) (namely, allocating a DRB for transmitting the data packet to the data stream) so as to transmit the data stream through the mapped DRB.

In the 4G technology, a monitoring mechanism is provided in which a timer is used to count of time and monitor whether a data packet can be delivered from the PDCP layer to the RLC layer and then to the MAC layer until it is finally sent out from the terminal within a preset period of time. The timer is actually managed by the PDCP layer and whether the data packet is sent from the terminal is also monitored by the PDCP layer. In addition, if a data packet fails to be sent from the terminal within a preset period of time, the data packet will be discarded, namely, it will be removed from a transmission queue to avoid the excessive occupy of communication resources by lots of data packets.

In the 5G technology, the SDAP layer is provided above the PDCP layer. The SDAP layer can control the data stream and a data stream is firstly loaded into a plurality of data packets in the SDAP layer, and then transferred to the underlying layers for processing. The SDAP layer supports data streams while the PDCP layer supports data packets, and the data streams supported by the SDAP layer cannot be found in the PDCP layer. Therefore, the PDCP layer cannot monitor the data streams in the SDAP layer. Furthermore, the monitoring mechanism in the 4G technology only involves the PDCP layer and the RLC layer, but it does not take into account time during which the data streams remain in the SDAP layer. Obviously, the monitoring mechanism used before is no longer applicable.

SUMMARY

Technical solutions provided by embodiments of the present disclosure are as follows:

According to a first aspect, there is provided a method for discarding a data packet, comprising:

receiving an instruction message sent from a base station, which instructs to start to monitor transmission timeout of a data packet in a SDAP layer;

starting, in the SDAP layer, a packet discarding timer corresponding to each data packet in a data stream of a target session according to the instruction message, after it is detected that the target session is initiated; and discarding the data packet corresponding to the packet discarding timer if the packet discarding timer expires and it is detected that the data packet corresponding to the packet discarding timer fails to be sent locally.

In the SDAP layer, the packet discarding timer corresponding to each data packet in the data stream of the target session is started according to the instruction message. Through the method provided by the present disclosure, a monitoring mechanism can be used for the SDAP layer, the PDCP layer and the RLC layer and time during which the data stream remains in the SDAP layer is also taken into account, so the monitoring of transmission timeout of a data packet is achieved in 5G technology.

Optionally, discarding the data packet corresponding to the packet discarding timer if the packet discarding timer expires and it is detected that the data packet corresponding to the packet discarding timer fails to be sent locally comprises:

determining a current layer in which the data packet corresponding to the packet discarding timer is located, if the packet discarding timer expires and it is detected that the data packet corresponding to the packet discarding timer fails to be sent locally; and discarding the data packet corresponding to the packet discarding timer in the current layer.

Through the above-mentioned optional solutions, the data packet corresponding to the packet discarding timer can be positioned and the positioned data packet can be discarded.

Optionally, determining a current layer in which the data packet corresponding to the packet discarding timer is located comprises:

searching for the data packet corresponding to the packet discarding timer starting from the SDAP layer;

searching for the data packet corresponding to the packet discarding timer in a next layer subsequent to a layer that is searched, if no data packet corresponding to the packet discarding timer is found in the layer that is searched;

determining the layer that is searched as the current layer, if the data packet corresponding to the packet discarding timer is found in the layer that is searched; and determining the next layer as the current layer, if the data packet corresponding to the packet discarding timer is found in the next layer.

Through the above-described optional solutions, the data packet corresponding to the packet discarding timer can be positioned and the positioned data packet can be discarded, which avoids waste of communication resources due to the transmission timeout of data packet corresponding to the packet discarding timer.

Optionally, the method further comprises:

transmitting data packet discarding information to the base station, wherein the data packet discarding information comprises an identification corresponding to the data packet that is discarded.

The base station is notified of which data packets are discarded, so that it does waits for these data packets any longer, which avoids decreasing the processing efficiency of the base station.

Optionally, before transmitting the data packet discarding information to the base station, the method further comprises:

determining, whenever a preset period of time passed by, an identification corresponding to a discarded data packet in the current duration; and generating the data packet discarding information based on the identification corresponding to the discarded data packet.

In order to reduce the signaling overhead, identifications corresponding to a plurality of discarded data packets can be comprised in a piece of data packet discarding information to be sent to the base station once.

Optionally, transmitting the data packet discarding information to the base station comprises:

adding the data packet discarding information to encapsulation of a target control message in a PDCP layer; and transmitting the target control message encapsulated with the data packet discarding information to the base station.

According to a second aspect, there is provided a method for discarding a data packet, comprising:

generating an instruction message, which instructs a terminal to start monitoring transmission timeout of a data packet in a SDAP layer; and transmitting the instruction message to the terminal.

Optionally, the method further comprises:

receiving a control message sent from the terminal, wherein the control message comprises data packet discarding information which comprises an identification corresponding to a discarded data packet; and when a lower boundary of a reordering window moves to a position corresponding to the data packet, moving the lower boundary down to a position corresponding to a next data packet subsequent to the data packet.

Through the above-described optional solution, the reordering window of the base station does not wait for the discarded data packet any longer, so unnecessary time resources will not be wasted and processing efficiency of the base station will be improved.

According to a third aspect, there is provided a device for discarding a data packet, comprising:

a receiving module configured to receive an instruction message sent from a base station, which instructs to start monitoring transmission timeout of a data packet in a SDAP layer;

a starting module configured to start, in the SDAP layer, a packet discarding timer corresponding to each data packet in a data stream of a target session according to the instruction message, if it is detected that the target session is initiated; and a discarding module configured to discard the data packet corresponding to the packet discarding timer, if the packet discarding timer expires and it is detected that the data packet corresponding to the packet discarding timer fails to be sent locally.

Optionally, the discarding module comprises:

a first determination unit configured to determine a current layer in which the data packet corresponding to the packet discarding timer is located, if the packet discarding timer expires and it is detected that the data packet corresponding to the packet discarding timer fails to be sent locally; and a discarding unit configured to discard the data packet corresponding to the packet discarding timer in the current layer.

Optionally, the first determination unit comprises:

a first search subunit configured to search for the data packet corresponding to the packet discarding timer starting from the SDAP layer;

a second search subunit configured to search for the data packet corresponding to the packet discarding timer in a next layer subsequent to a layer that is searched, if no data packet corresponding to the packet discarding timer is found in the layer that is searched;

a first determination subunit configured to determine the layer that is searched as the current layer, if the data packet corresponding to the packet discarding timer is found in the layer that is searched; and a second determination subunit configured to determine the next layer as the current layer, if the data packet corresponding to the packet discarding timer is found in the next layer.

Optionally, the device further comprises:

a first transmitting module configured to transmit data packet discarding information to the base station, wherein the data packet discarding information comprises an identification corresponding to the discarded data packet.

Optionally, the device further comprises:

a determination module configured to determine, whenever a preset period of time passing by, an identification corresponding to a discarded data packet in the current period; and a second transmitting module configured to generate the data packet discarding information based on the identification corresponding to the discarded data packet.

Optionally, the first transmitting module comprises:

an addition unit configured to add the data packet discarding information to encapsulation of a target control message in a PDCP layer; and a transmitting unit configured to transmit the target control message encapsulated with the data packet discarding information to the base station.

According to a fourth aspect, there is provided a device for discarding a data packet, comprising:

a generation module configured to generate an instruction message, which instructs a terminal to start monitoring transmission timeout of a data packet in a SDAP layer; and a transmitting module configured to transmit the instruction message to the terminal.

Optionally, the device further comprises:

a receiving module configured to receive a control message transmitted from the terminal, wherein the control message comprises data packet discarding information which comprises an identification corresponding to a discarded data packet; and a down shifting module configured to, if a lower boundary of a reordering window moves to a position corresponding to the data packet, move the lower boundary down to a position corresponding to a next data packet subsequent to the data packet.

According to a fifth aspect, there is provided a system for discarding a data packet, wherein the system comprises a terminal and a base station;

the terminal is configured to receive an instruction message transmitted from a base station, which instructs to start monitoring transmission timeout of a data packet a SDAP layer; start a packet discarding timer corresponding to each data packet in a data stream of a target session in the SDAP layer according to the instruction message, after it is detected that the target session is initiated; and discard the data packet corresponding to the packet discarding timer if the packet discarding timer expires and it is detected that the data packet corresponding to the packet discarding timer fails to be transmitted locally; and the base station is configured to generate an instruction message, which instructs a terminal to start monitoring transmission timeout of a data packet in a SDAP layer; and transmit the instruction message to the terminal.

According to a sixth aspect, there is provided a terminal, comprising: a processor and a storage, wherein the storage stores at least one instruction, at least one program, a set of codes or a set of instructions which, when loaded and executed by the processor, implement the above-described method for discarding the data packet.

According to a seventh aspect, there is provided a computer readable storage medium, which stores at least one instruction, at least one program, a set of codes or a set of instructions which, when loaded and executed by the processor, implement the above-described method for discarding the data packet.

According to an eighth aspect, there is provided a base station, comprising: a processor and a storage, wherein the storage stores at least one instruction, at least one program, a set of codes or a set of instructions which, when loaded and executed by the processor, implement the above-described method for discarding the data packet.

According to a ninth aspect, there is provided a computer readable storage medium, which stores at least one instruction, at least one program, a set of codes or a set of instructions which, when loaded and executed by the processor, implement the method for discarding the data packet.

The beneficial effects brought by the technical solutions provided by the embodiments of the present disclosure are as follows:

In the SDAP layer, the packet discarding timer corresponding to each data packet in the data stream of the target session is started according to the instruction message. Through the method provided by the present disclosure, a monitoring mechanism can be used for the SDAP layer, the PDCP layer and the RLC layer and time during which the data stream stays in the SDAP layer is also taken into account, so that the monitoring of transmission timeout of a data packet is achieved in 5G technology.

BRIEF DESCRIPTION OF THE DRAWINGS

In order to explain the technical solutions in the embodiments of the present disclosure more clearly, a simple introduction to the drawings required for describing the embodiments will be given below. Obviously, the drawings described below only illustrate some embodiments of the present disclosure, and for one of ordinary skills in the art, other drawings may be obtained based on these drawings without inventive work.

DETAILED DESCRIPTION

In order to make purposes, technical solutions and advantages of the present disclosure more clear, hereinafter, the embodiments of the present disclosure will be further described in detail in conjunction with the drawings.

The embodiments of the present disclosure provide a method for discarding a data packet, which can be implemented by a terminal and a base station. The terminal can be a mobile phone, a tablet computer, and can comprise components such as a transceiver, a processor and a storage. The transceiver can perform data transmission with a server, for example, transmit a data packet to the base station. The transceiver can comprise a Bluetooth component, a Wireless-Fidelity (WiFi) component, an antenna, a matching circuit or a modem. The processor can be a Central Processing Unit (CPU), which can be configured to start a packet discarding timer corresponding to each data packet in a data stream of a target session in the SDAP layer according to the instruction message, after it is detected that the target session is initiated. The storage can be an Random Access Memory (RAM), a flash memory (Flash) and etc., which can be configured to store received data, data required for processing, data generated during processing, such as a data packet of a target data stream.

The terminal can also comprise an input component, a display component or an audio output component. The input component can be a touch screen, a keyboard or a mouse. The audio output component can be a speaker or a headphone.

Figure 1:
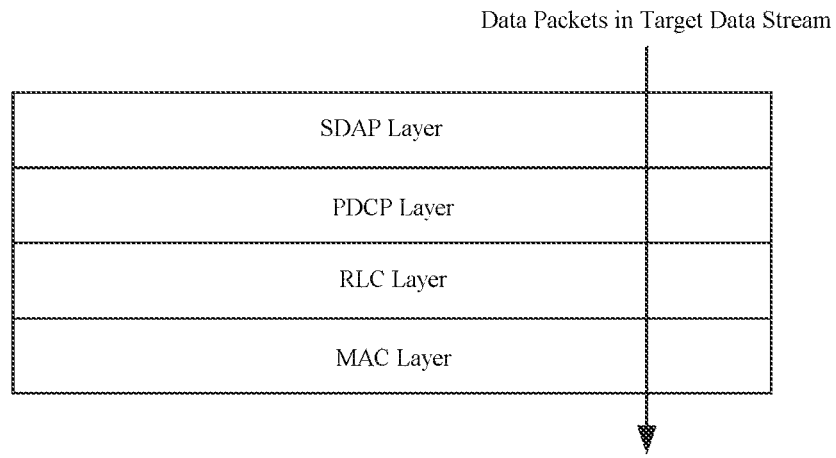
FIG. 1 is a schematic diagram of a communication underlying architecture according to an embodiment of the present disclosure.

It should be noted that, as shown in FIG. 1, a communication underlying architecture comprises a SDAP layer, a PDCP layer, an RLC layer and a MAC layer from top to bottom in 5G technology. When establishing a session with the base station, the terminal can transmit multiple data streams in the session, each of which can comprise multiple data packets, which are delivered from top to bottom in the communication underlying architecture of the terminal until they are sent to the base station from the last layer. The data packets are comprised in the terminal in the form of data streams before they are split and the SDAP layer can allocate DRBs to the data streams for transmitting the data streams. After the SDAP layer allocates the DRBs to the data streams, the data streams are delivered to the underlying layers in the form of data packets. At initial allocation, the same DRBs are allocated to the same data streams.

Figure 2:
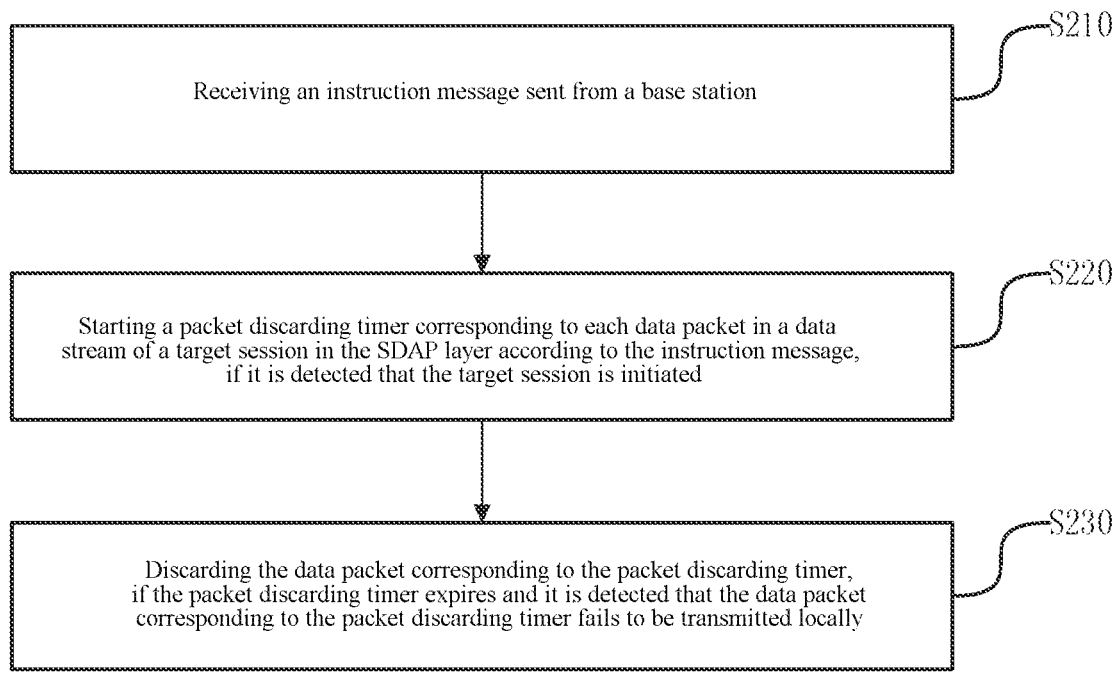
FIG. 2 is a flowchart of a method for discarding a data packet according to an embodiment of the present disclosure.

FIG. 2 is a flowchart illustrating a method for discarding a data packet according to an embodiment of the present disclosure. Referring to FIG. 2, the method for discarding a data packet comprises the following steps.

Step S210, receiving an instruction message sent from a base station, which instructs to start monitoring transmission timeout of a data packet in a SDAP layer.

Step S220, starting a packet discarding timer corresponding to each data packet in a data stream of a target session in the SDAP layer according to the instruction message, if it is detected that the target session is initiated.

Step S230, discarding the data packet corresponding to the packet discarding timer, if the packet discarding timer expires and it is detected that the data packet corresponding to the packet discarding timer fails to be transmitted locally.

In the implementation, when receiving the instruction message sent from the base station, the terminal can accordingly start the function of monitoring the transmission timeout of a data packet in the SDAP layer. If timing duration setting information exists in the instruction message, the timing duration of the packet discarding timer can be set. The packet discarding timer monitors and keeps account of a duration during which the data packets in a target data stream are delivered from the SDAP layer to the underlying layers, and are finally sent out from the terminal.

The above-described method can be performed in the terminal. In the SDAP layer, the packet discarding timer corresponding to each data packet in the data stream of the target session is started according to the instruction message. By the method provided by the present disclosure, a monitoring mechanism can be used for the SDAP layer, the PDCP layer and the RLC layer and time during which the data stream remains in the SDAP layer is also taken into account, so the monitoring of transmission timeout of a data packet is achieved in 5G technology.

Figure 3:
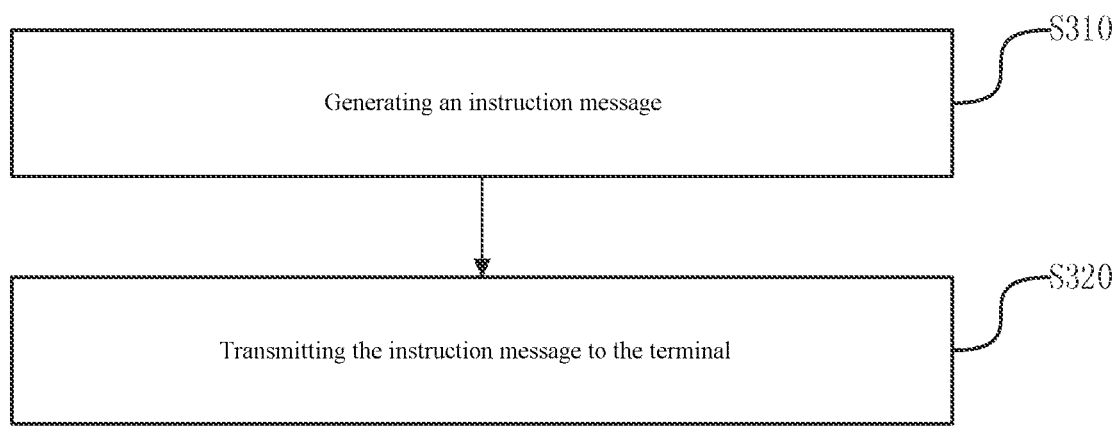
FIG. 3 is a flowchart of a method for discarding a data packet according to an embodiment of the present disclosure.

FIG. 3 is a flowchart of a method for discarding a data packet according to an embodiment of the present disclosure. Referring to FIG. 3, the method comprises the following steps.

Step S310, generating an instruction message, which instructs a terminal to start monitoring transmission timeout of a data packet in a SDAP layer.

The instruction message can be a Radio Resource Control (RRC) message. The instruction message is configured to instruct the terminal to monitor the transmission timeout of a data packet in the SDAP layer. Optionally, the RRC message can further comprise timing duration setting information, which instructs to set timing duration for the packet discarding timer which monitors whether the transmission of the data packet is timed out.

Step S320, transmitting the instruction message to the terminal.

The above-described method can be performed in the terminal. The instruction message instructs the terminal to start monitoring transmission timeout of the data packet in the SDAP layer. By the method provided by the present disclosure, a monitoring mechanism can be used for the SDAP layer, the PDCP layer and the RLC layer and time during which the data stream remains in the SDAP layer is also taken into account, so the monitoring of transmission timeout of a data packet is achieved in 5G technology.

Figure 4:
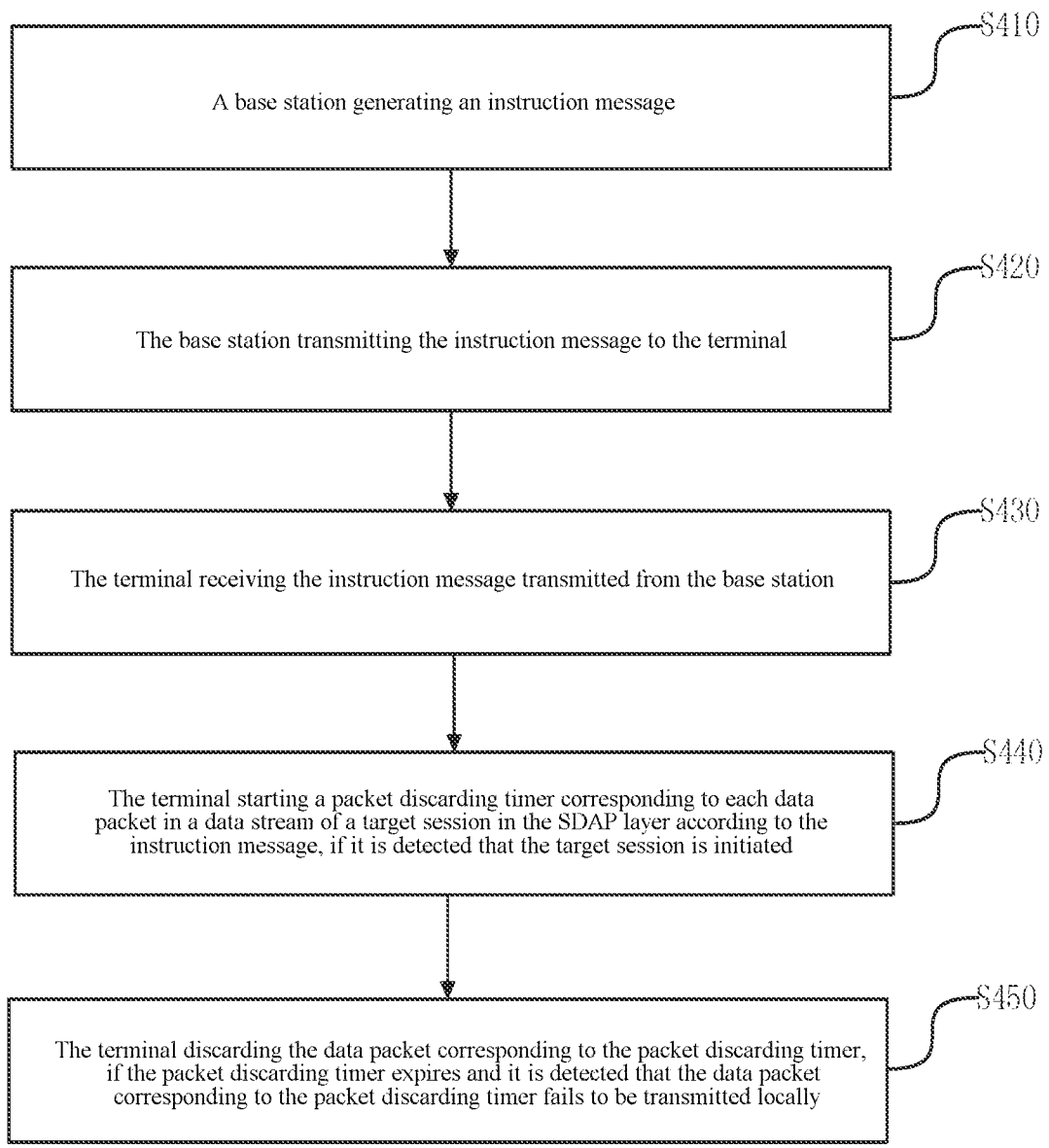
FIG. 4 is a flowchart of a method for discarding a data packet according to an embodiment of the present disclosure.

FIG. 4 is a flowchart of a method for discarding a data packet according to an embodiment of the present disclosure. Referring to FIG. 4, the method comprises the following steps.

Step S410, a base station generating an instruction message, which instructs a terminal to start monitor transmission timeout of a data packet in a SDAP layer.

The instruction message can be an RRC message. The instruction message is configured to instruct the terminal to monitor the transmission timeout of a data packet in the SDAP layer. Optionally, the RRC message can further comprise timing duration setting information, which instructs to set timing duration for the packet discarding timer which monitors whether the transmission of the data packet is timed out.

Step S420, the base station transmitting the instruction message to the terminal.

During implementation, the base station can transmit the generated instruction message to the terminal.

Step S430, the terminal receiving the instruction message sent from the base station, which instructs to start the monitoring of the transmission timeout of the data packet in the SDAP layer.

In the implementation, when receiving the instruction message sent from the base station, the terminal can accordingly start the function of monitoring the transmission timeout of the data packet in the SDAP layer. If timing duration setting information exists in the instruction message, the timing duration of the packet discarding timer may be set. The packet discarding timer monitors and keeps account of a duration during which the data packets in a target data stream are delivered from the SDAP layer to the underlying layers, and are finally sent out from the terminal.

Step S440, the terminal starting a packet discarding timer corresponding to each data packet in a data stream of a target session in the SDAP layer according to the instruction message, if it is detected that the target session is initiated.

During implementation, a plurality of packet discarding timers are provided, each of which keeps account of time taken for the transmission of each of the data packets in the target data stream. The terminal will reset the packet discarding timer corresponding to the data packet, if the data packet has been successfully sent from the terminal. The following step S450 will be performed, if it is monitored that the data packet fails to be sent from the terminal after the packet discarding timer corresponding to the data packet expires.

Step S450, the terminal will discard the data packet corresponding to the packet discarding timer, if the packet discarding timer expires and it is detected that the data packet corresponding to the packet discarding timer fails to be sent locally.

During implementation, if the packet discarding timer expires and it is detected that the data packet corresponding to the packet discarding timer fails to be sent locally, the terminal can discard the data packet corresponding to the packet discarding timer which expires from a transmission queue.

Figure 5:
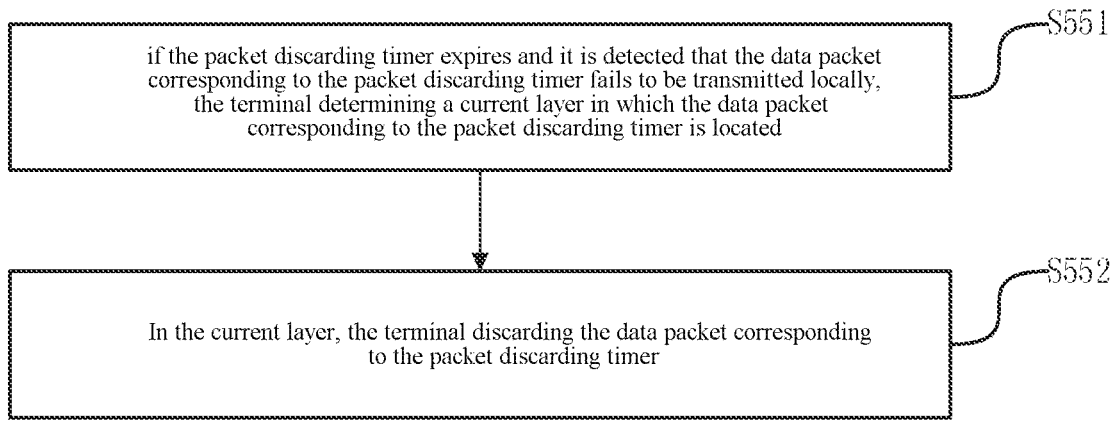
FIG. 5 is a flowchart of a method for discarding a data packet according to an embodiment of the present disclosure.

Optionally, as illustrated in FIG. 5, the step S450 can comprise step S551 and step S552. In step S551, if the packet discarding timer expires and it is detected that the data packet corresponding to the packet discarding timer fails to be sent locally, the terminal determines a current layer in which the data packet corresponding to the packet discarding timer is located. In step S552, the terminal discards the data packet corresponding to the packet discarding timer in the current layer.

Figure 6:
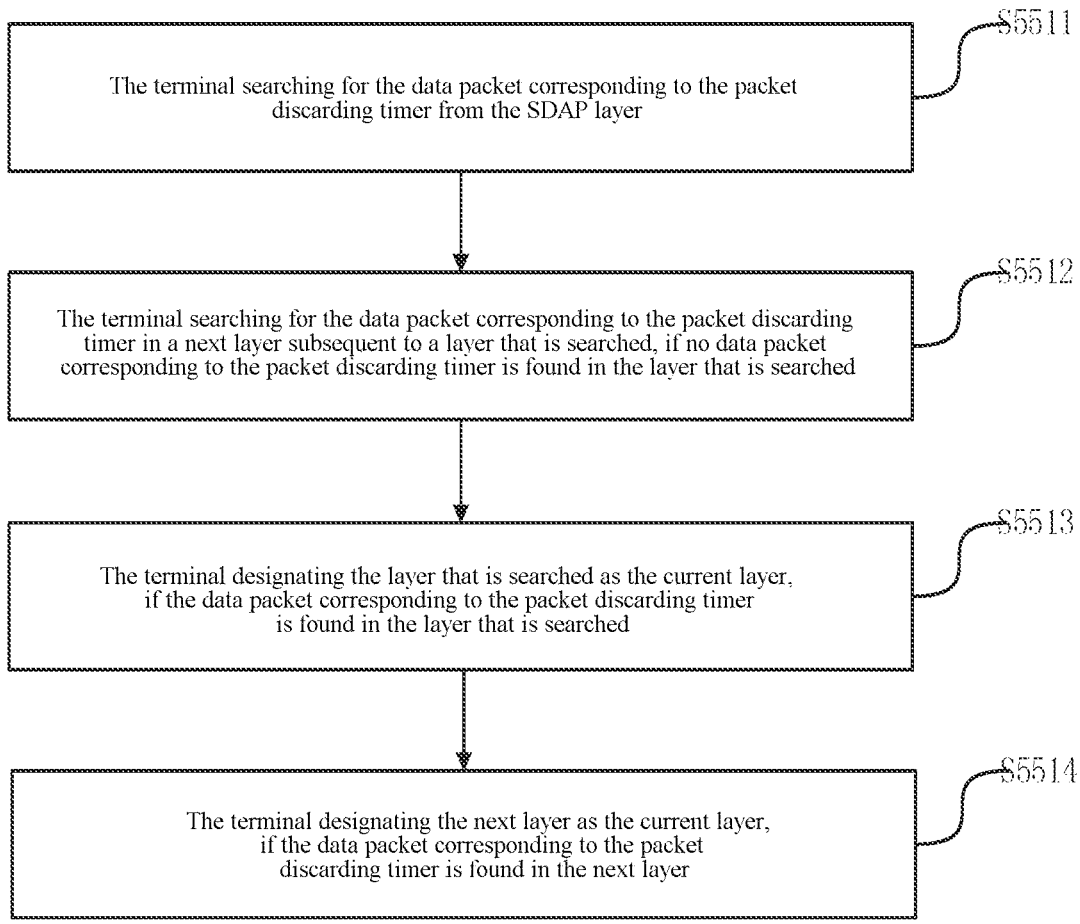
FIG. 6 is a flowchart of a method for discarding a data packet according to an embodiment of the present disclosure.

Optionally, as illustrated in FIG. 6, step S551 can comprise step S5511 and step S5512. In step S5511, the terminal searches for the data packet corresponding to the packet discarding timer starting from the SDAP layer. In step S5512, the terminal searches for the data packet corresponding to the packet discarding timer in a next layer subsequent to a layer that is searched, if no data packet corresponding to the packet discarding timer is found in the layer that is searched. In step S5513, the terminal determines the layer that is searched as the current layer, if the data packet corresponding to the packet discarding timer is found in the layer that is searched. In step S5514, the terminal determines the next layer as the current layer, if the data packet corresponding to the packet discarding timer is found in the next layer.

Figure 7:
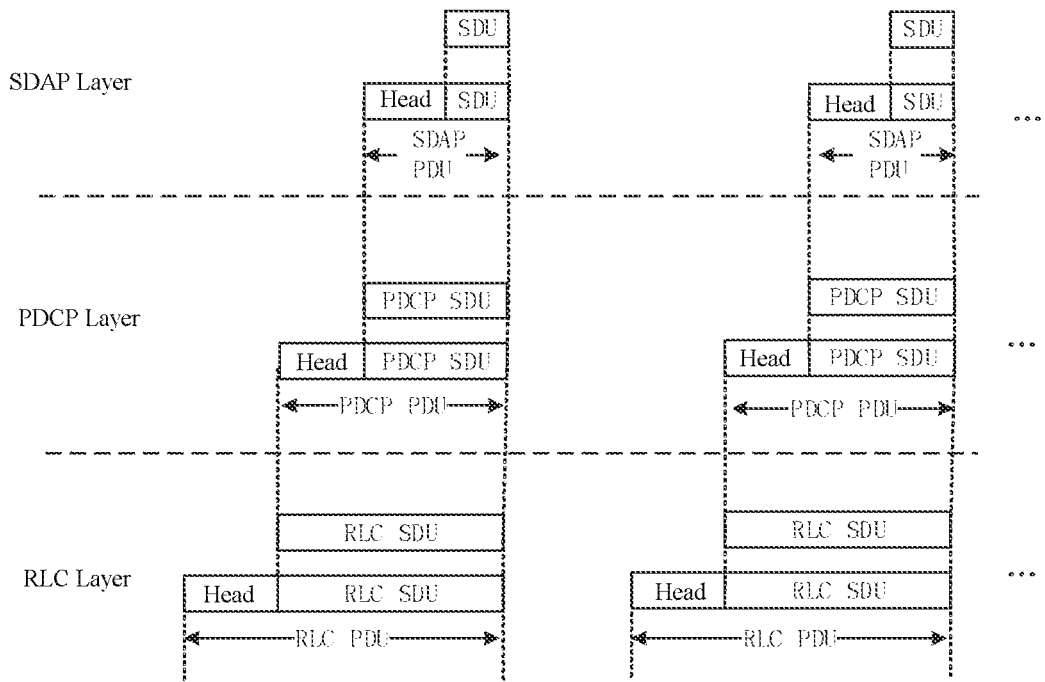
FIG. 7 is a schematic diagram of a data packet structure according to an embodiment of the present disclosure.

During implementation, as illustrated in FIG. 7, there are two types of data packets in the layers of the communication underlying architecture: one is a Service Data Unit (SDU), and the other is a Packet Data Unit (PDU). The SDU and header (information) are encapsulated, and the encapsulated SDU is a PDU. For the layers of the communication underlying architecture, the PDU of each layer is the SDU of the next layer.

In the embodiment, starting from the SDAP layer, the terminal judges whether the data packet corresponding to the packet discarding timer is in the SDAP layer. If the data packet corresponding to the packet discarding timer is in the SDAP layer and the data packet is a SDAP SDU, the SDAP SDU will be deleted; and if the data packet has been encapsulated to be a SDAP PDU, the SDAP SDU and its corresponding SDAP PDU will be deleted. If the data packet corresponding to the packet discarding timer is not in the SDAP layer, the SDAP layer informs the PDCP layer of deleting the data packet corresponding to the packet discarding timer. If the data packet corresponding to the packet discarding timer is in the PDCP layer, the data packet is a PDCP SDU, and then the PDCP SDU will be deleted; and if the data packet has been encapsulated to be a PDCP PDU, then the PDCP SDU and its corresponding PDCP PDU will be deleted. If the data packet corresponding to the packet discarding timer is not in the PDCP layer, the PDCP layer informs the RLC layer of deleting the data packet corresponding to the packet discarding timer. If the data packet corresponding to the packet discarding timer is in the RLC layer, then the data packet is an RLC SDU, and the RLC SDU will be deleted; and if the data packet has been encapsulated to be an RLC PDU, then the RLC SDU and its corresponding RLC PDU will be deleted.

Optionally, the method provided by the embodiment of the present disclosure further comprises: the terminal transmitting data packet discarding information to the base station, wherein the data packet discarding information comprises an identification corresponding to the discarded data packet.

The identification corresponding to the data packet can be a Serial Number (SN). The terminal notifies the base station of which data packets are discarded by transmitting the data packet discarding information to the base station.

Figure 8:
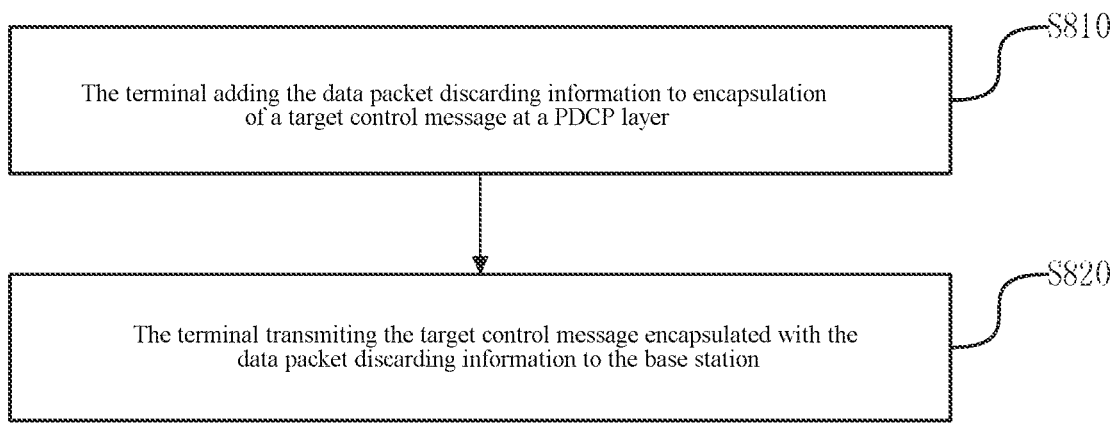
FIG. 8 is a flowchart of a method for discarding a data packet according to an embodiment of the present disclosure.

Optionally, as illustrated in FIG. 8, the step of the terminal transmitting the data packet discarding information to the base station comprises step S810 and step S820. In step S810, the terminal adds the data packet discarding information to encapsulation of a target control message in a PDCP layer. In step S820, the terminal transmits the target control message encapsulated with the data packet discarding information to the base station.

In the above manner, the terminal can add the data packet discarding information to the encapsulation of the control message in the PDCP layer, so that the base station can identify the data packet discarding information in the control message in the PDCP layer on the base station side. The target control message is different from general data. The general data carries a large amount of substantial information, such as streaming media information. The control message is a dedicated message for controlling communication.

In addition, the terminal can also place the identification corresponding to the discarded data packet in the RRC message and transmit the RRC message to the base station. Alternatively, the terminal can directly generate a piece of signaling information in the PDCP layer which indicates data packets that are discarded in the PDCP layer and will be sent to the base station, which will not be elaborated herein.

Figure 9:
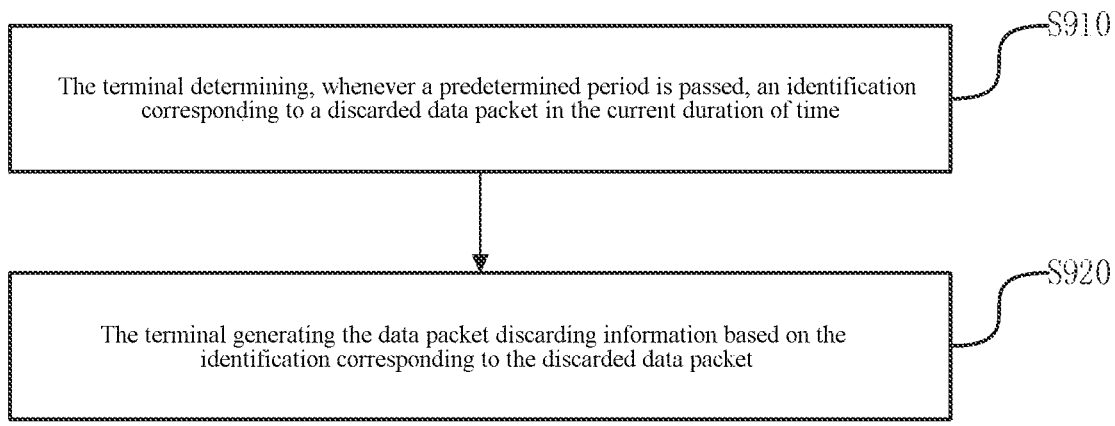
FIG. 9 is a flowchart of a method for discarding a data packet according to an embodiment of the present disclosure.

Optionally, in order to save signaling overhead, the terminal can generate a piece of data packet discarding information based on the identifications corresponding to several discarded data packets, and transmit it to the base station. As illustrated in FIG. 9, before the terminal transmits the data packet discarding information to the base station, the method provided by the embodiment further comprises step S910 and step S920. In step S910, the terminal determines, whenever a preset period of time passed by, an identification corresponding to a discarded data packet in the current duration of time. In step S920, the terminal generates data packet discarding information based on the identification corresponding to the discarded data packet.

If a piece of data packet discarding information is generated based on identifications corresponding to the preset number of discarded data packets until the preset number of discarded data packets arrives, however, in some cases, it takes long time to wait. Therefore, the terminal can count time through a signaling timer. Each time the signaling timer expires, a piece of data packet discarding information is generated based on identifications corresponding to the discarded data packets that exists, and then it is sent to the base station. It should be noted that duration that the signaling timer counts time is shorter than duration that an ordering timer counts time in the reordering window at the base station. The ordering timer in the reordering window is configured to count arrival time of data packets to be received in the reordering window. When the ordering timer expires, the reordering window will not wait for the data packet corresponding to the ordering timer any longer, and starts receiving the next data packet.

Figure 10:
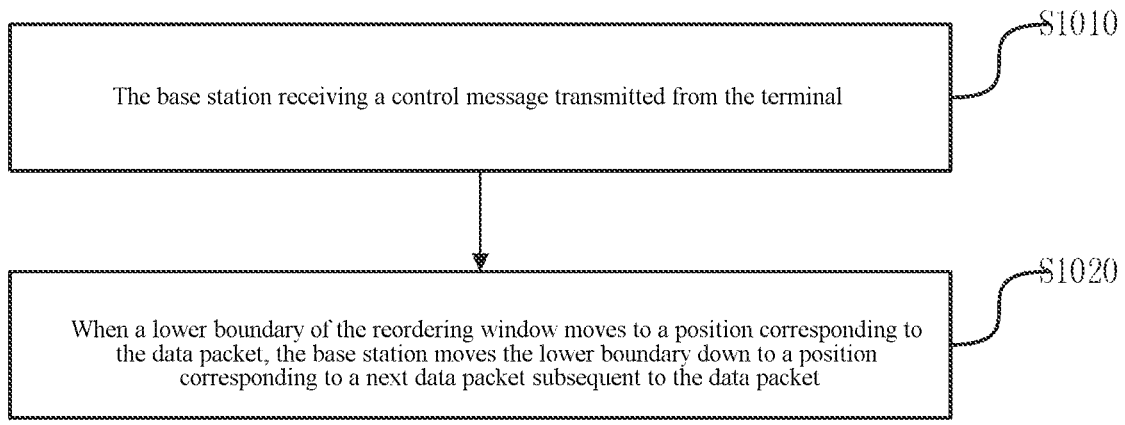
FIG. 10 is a flowchart of a method for discarding a data packet according to an embodiment of the present disclosure.

Optionally, as illustrated in FIG. 10, the method provided by the embodiment of the present disclosure further comprises step S1010 and step S1020. In step S1010, the base station receives a control message transmitted from the terminal, wherein the control message comprises data packet discarding information which comprises the identification corresponding to the discarded data packet. In step S1020, when a lower boundary of the reordering window moves to a position corresponding to the data packet, the base station moves the lower boundary down to a position corresponding to a next data packet subsequent to the data packet.

When the base station receives the data packet discarding information transmitted from the terminal, for each discarded data packet recorded in the data packet discarding information, when the lower boundary of the reordering window is moved to a position corresponding to the discarded data packet, the base station moves the lower boundary down to a position corresponding to a next data packet subsequent to the discarded data packet. For example, the SNs corresponding to the data packets to be ordered in the reordering window are 1, 2, 3, 4, 5 and 6. The SNs corresponding to the discarded data packets are 3 and 5. Firstly, the lower boundary of the reordering window is located at a position corresponding to the data packet the SN of which is 1. When the data packet the SN of which is 1 is received, the lower boundary of the reordering window is moved to a position corresponding to the data packet the SN of which is 2. When the data packet whose SN is 2 is received, the lower boundary of the reordering window is moved to a position corresponding to the data packet the SN of which is 3. It is determined that the data packet the SN of which is 3 is discarded, and the lower boundary of the reordering window is moved to a position corresponding to the data packet the SN of which is 4. When the data packet the SN of which is 4 is received, the lower boundary of the reordering window is moved to a position corresponding to the data packet the SN of which is 5. It is determined that the data packet the SN of which is 5 is discarded, and the lower boundary of the reordering window is moved to a position corresponding to the data packet the SN of which is 6. It should be noted that the above operations are performed in the PDCP layer of the base station. Of course, the above operations can also be performed in the RLC layer of the base station, as long as the data packet discarding information transmitted from the terminal is adjusted accordingly.

In the SDAP layer, the packet discarding timer corresponding to each data packet in the data stream of the target session is started according to the instruction message. By the method provided by the present disclosure, the monitoring mechanism can be used for the SDAP layer, the PDCP layer and the RLC layer and time during which the data stream stays in the SDAP layer is also taken into account, so the monitoring of transmission timeout of a data packet is achieved in 5G technology.

Figure 11:
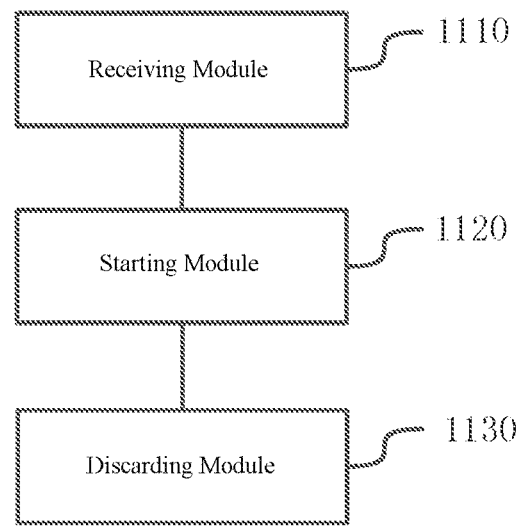
FIG. 11 is a block diagram of a device for discarding a data packet according to an embodiment of the present disclosure.

FIG. 11 is a block diagram illustrating a device for discarding a data packet according to an embodiment of the present disclosure. Referring to FIG. 11, the device comprises a receiving module 1110, a starting module 1120 and a discarding module 1130.

The receiving module 1110 is configured to receive an instruction message transmitted from a base station, which instructs to start monitoring transmission timeout of a data packet in a SDAP layer.

The starting module 1120 is configured to start a packet discarding timer corresponding to each data packet in a data stream of a target session in the SDAP layer according to the instruction message, if it is detected that the target session is initiated.

The discarding module 1130 is configured to discard the data packet corresponding to the packet discarding timer, if the packet discarding timer expires and it is detected that the data packet corresponding to the packet discarding timer fails to be transmitted locally.

Figure 12:
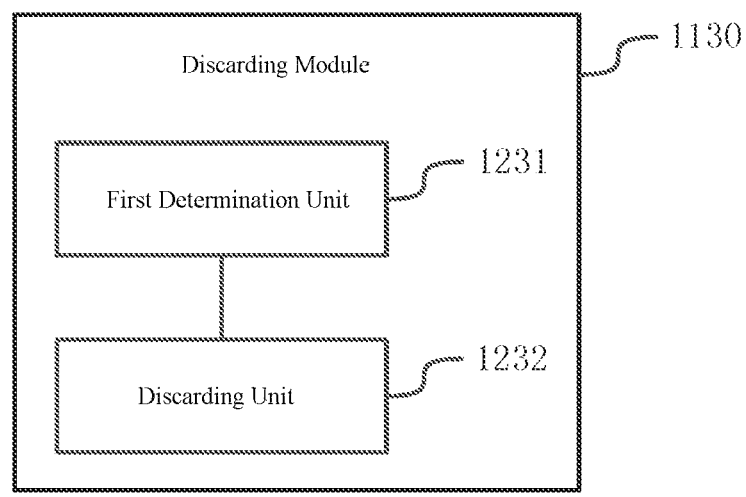
FIG. 12 is a block diagram of a device for discarding a data packet according to an embodiment of the present disclosure.

Optionally, as illustrated in FIG. 12, the discarding module 1130 comprises a first determination unit 1231 and a discarding unit 1232.

The first determination unit 1231 is configured to determine a current layer in which the data packet corresponding to the packet discarding timer is located, if the packet discarding timer expires and it is detected that the data packet corresponding to the packet discarding timer fails to be transmitted locally.

The discarding unit 1232 is configured to discard the data packet corresponding to the packet discarding timer in the current layer.

Optionally, the first determination unit 1231 comprises a first search subunit, a second search subunit, a first determination subunit and a second determination subunit.

The first search subunit is configured to search for the data packet corresponding to the packet discarding timer starting from the SDAP layer.

The second search subunit is configured to search for the data packet corresponding to the packet discarding timer in a next layer subsequent to a layer that is searched, if no data packet corresponding to the packet discarding timer is found in the layer that is searched.

The first determination subunit is configured to determine the layer that is searched as the current layer, if the data packet corresponding to the packet discarding timer is found in the layer that is searched.

The second determination subunit is configured to determine the next layer as the current layer, if the data packet corresponding to the packet discarding timer is found in the next layer.

Optionally, the device further comprises:

a first transmitting module configured to transmit data packet discarding information to the base station, wherein the data packet discarding information comprises an identification corresponding to the discarded data packet.

Figure 13:
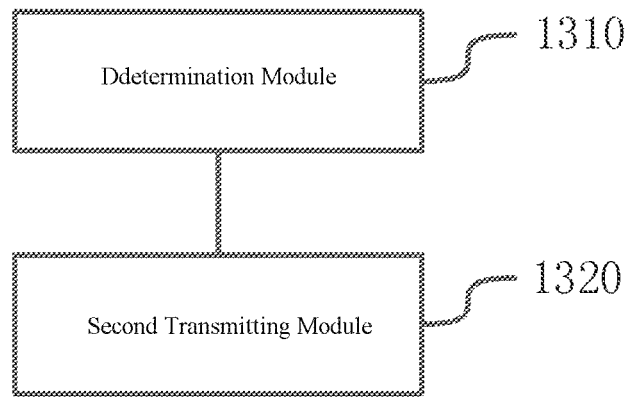
FIG. 13 is a block diagram of a device for discarding a data packet according to an embodiment of the present disclosure.

Optionally, as illustrated in FIG. 13, the device further comprises:

a determination module 1310 configured to determine, whenever a preset period of time passed by, an identification corresponding to a discarded data packet in the current period; and a second transmitting module 1320 configured to generate the data packet discarding information based on the identification corresponding to the discarded data packet.

Figure 14:
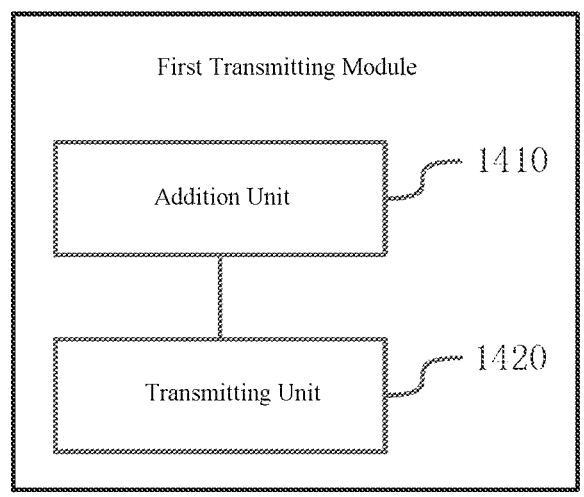
FIG. 14 is a block diagram of a device for discarding a data packet according to an embodiment of the present disclosure.

Optionally, as illustrated in FIG. 14, the first transmitting module comprises:

an addition unit 1410 configured to add the data packet discarding information to encapsulation of a target control message in a PDCP layer; and a transmitting unit 1420 configured to transmit the target control message encapsulated with the data packet discarding information to the base station.

Figure 15:
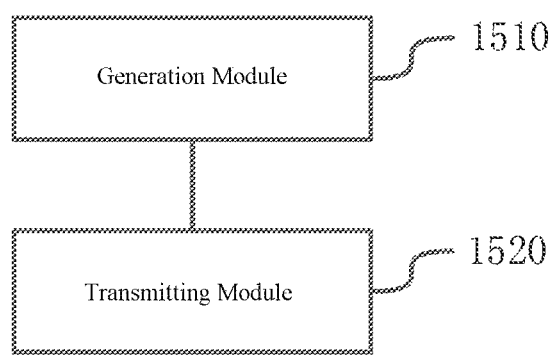
FIG. 15 is a block diagram of a device for discarding a data packet according to an embodiment of the present disclosure.

FIG. 15 is a block diagram illustrating a device for discarding a data packet according to an embodiment of the present disclosure. Referring to FIG. 15, the device comprises a generation module 1510 and a transmitting module 1520.

The generation module 1510 is configured to generate an instruction message, which instructs a terminal to start monitoring transmission timeout of a data packet in a SDAP layer.

The transmitting module 1520 is configured to transmit the instruction message to the terminal.

Figure 16:
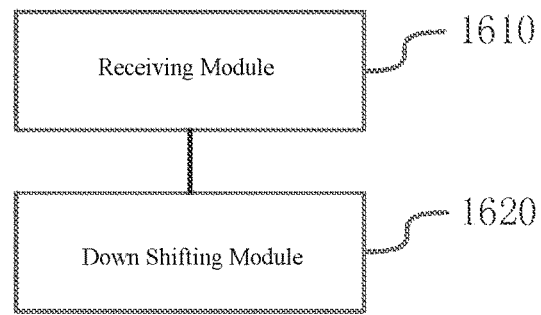
FIG. 16 is a block diagram of a device for discarding a data packet according to an embodiment of the present disclosure.

Optionally, as illustrated in FIG. 16, the device further comprises a receiving module 1610 and a down shifting module 1620.

The receiving module 1610 is configured to receive a control message transmitted from the terminal, wherein the control message comprises data packet discarding information which comprises an identification corresponding to a discarded data packet.

The down shifting module 1620 is configured to, when a lower boundary of a reordering window moves to a position corresponding to the data packet, move the lower boundary down to a position corresponding to a next data packet subsequent to the data packet.

In the SDAP layer, the packet discarding timer corresponding to each data packet in the data stream of the target session is started according to the instruction message. By the device provided by the present disclosure, a monitoring mechanism can be used for the SDAP layer, the PDCP layer and the RLC layer and time during which the data stream stays in the SDAP layer is also taken into account, so that the monitoring of transmission timeout of a data packet is achieved in 5G technology.

It should be noted that the discarding of the data packet performed by the device for discarding the data packet according to the above embodiments is only illustrated as the functional modules in, for example, the above division manner. In practical application, the above functions may be assigned to different functional modules as desired, that is, the internal structure of the device may be divided into different functional modules to accomplish all or a part of the functions described above. Besides, the above embodiments of the device for discarding the data packet and the embodiments of the method for discarding the data packet belong to the same inventive concept, and the specific operating procedure of the device can refer to the embodiments of the method. Therefore, the description thereof will not be repeated herein.

Another exemplary embodiment of the present disclosure provides a system for discarding a data packet comprising a terminal and a base station.

The terminal is configured to receive an instruction message transmitted from a base station, which instructs to start monitoring transmission timeout of a data packet in a SDAP layer; start a packet discarding timer corresponding to each data packet in a data stream of a target session in the SDAP layer according to the instruction message, if it is detected that the target session is initiated; and discard the data packet corresponding to the packet discarding timer, if the packet discarding timer expires and it is detected that the data packet corresponding to the packet discarding timer fails to be transmitted locally.

The base station is configured to generate an instruction message, which instructs a terminal to start monitoring transmission timeout of a data packet in a SDAP layer; and transmit the instruction message to the terminal.

It should be noted that the system and the method for discarding the data packet provided by the above-described embodiments belong to the same conception, therefore, the detailed implementing process thereof may refer to the embodiments of the method, and the detailed description thereof will not be repeated herein.

Figure 17:
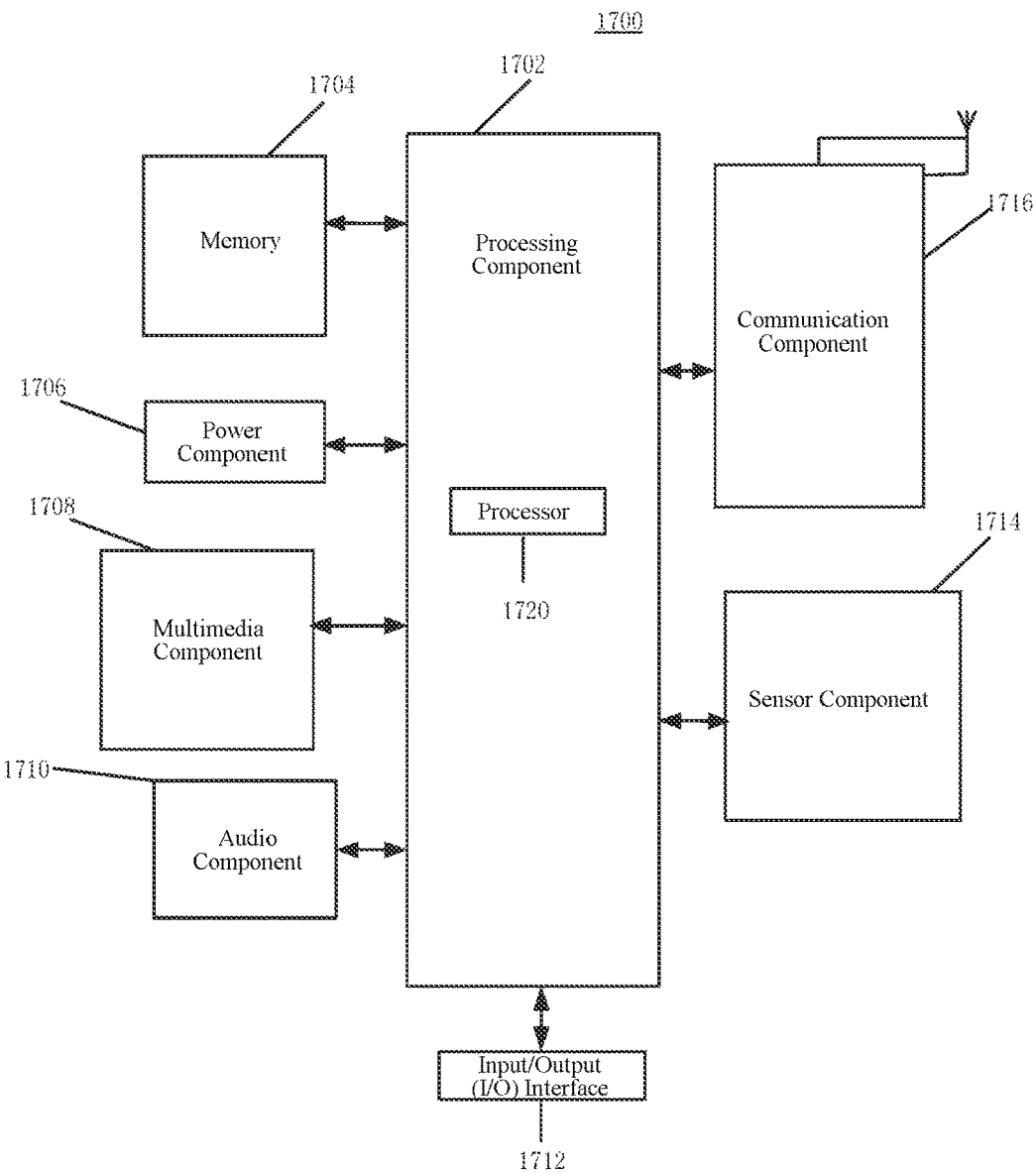
FIG. 17 is a block diagram of a terminal according to an embodiment of the present disclosure.

Still another exemplary embodiment of the present disclosure provides a block diagram illustrating a terminal. Referring to FIG. 17, a terminal 1700 may comprise one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the terminal 1700, such as the operations associated with display, telephone calls, data communications, camera operations, and recording operations. The processing component 1702 can comprise one or more processors 1720 configured to execute instructions to perform all or part of the steps in the above described methods. Moreover, the processing component 1702 can comprise one or more modules which facilitate interaction between the processing component 1702 and other components. For instance, the processing component 1702 can comprise a multimedia module to facilitate interaction between the multimedia component 1708 and the processing component 1702.

The memory 1704 is configured to store various types of data to support the operation of the terminal 1700. Examples of such data comprise instructions for any applications or methods operated on the terminal 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The communication component 1716 is configured to facilitate communication, wired or wirelessly, between the terminal 1700 and other devices. The terminal 1700 can access a wireless network based on a communication standard, such as WiFi, 2G, or 3G, or a combination thereof. In one exemplary embodiment, the communication component 1716 receives a broadcast signal or broadcast associated information from an external broadcast management system via a broadcast channel. In one exemplary embodiment, the communication component 1716 further comprises a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The power component 1706 provides power to various components of the terminal 1700. The power component 1706 can comprise a power management system, one or more power sources, and any other components associated with generation, management, and distribution of power in the terminal 1700.

The multimedia component 1708 comprises a screen providing an output interface between the terminal 1700 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, drawings, and gestures on the touch panel. The touch sensors may not only sense a boundary of a touch or drawing action, but also sense duration and a pressure associated with the touch or drawing action. In some embodiments, the multimedia component 1708 comprises a front camera and/or a rear camera. The front camera and/or the rear camera can receive an external multimedia datum while the terminal 1700 is in an operation mode, such as a photographing mode or a video mode. Each of the front camera and the rear camera can be a fixed optical lens system or have focus and optical zoom capability.

The audio component 1710 is configured to output and/or input audio signals. For example, the audio component 1710 comprises a microphone ("MIC") configured to receive an external audio signal when the terminal 1700 is in an operation mode, such as a call mode, a recording mode, and a speech recognition mode. The received audio signal can be further stored in the memory 1704 or transmitted via the communication component 1716.

The I/O interface 1712 provides an interface between the processing component 1702 and peripheral interface modules, such as a keyboard, a click wheel, a button, and the like. The button can comprise, but is not limited to, a home button, a volume button, a starting button, and a locking button.

The sensor component 1714 comprises one or more sensors to provide status assessments of various aspects of the terminal 1700. For instance, the sensor component 1714 can detect an ON/OFF status of the terminal 1700, relative positioning of components, e.g., the display and the keypad, of the terminal 1700. The sensor component 1714 can further detect a change in position of the terminal 1700 or a component of the terminal 1700, a presence or absence of user contact with the terminal 1700, an orientation or an acceleration/deceleration of the terminal 1700, and a change in temperature of the terminal 1700. The sensor component 1714 can comprise a proximity sensor configured to detect the presence of nearby objects without any physical contact. The sensor component 1714 can also comprise a light sensor, such as a CMOS or CCD image sensor, for use in imaging applications. In some embodiments, the sensor component 1714 can further comprise an accelerometer sensor, a gyroscope sensor, a magnetic sensor, a pressure sensor, or a temperature sensor.

In exemplary embodiments, the terminal 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a computer-readable storage medium comprising instructions, such as the memory 1704 comprising instructions, executable by the processor 1720 in the terminal 1700, for performing the above-described methods. For example, the computer-readable storage medium can be a ROM, a random access memory (RAM), a CD-ROM, a magnetic tape, a floppy disc, an optical data storage device, and the like.

Still another embodiment of the present disclosure provides a computer-readable storage medium comprising instructions which, when executed by a processor of a terminal, allows the terminal to:

receive an instruction message transmitted from a base station, which instructs to start monitoring transmission timeout of a data packet in a SDAP layer;

start a packet discarding timer corresponding to each data packet in a data stream of a target session in the SDAP layer according to the instruction message, if it is detected that the target session is initiated; and discard the data packet corresponding to the packet discarding timer, if the packet discarding timer expires and it is detected that the data packet corresponding to the packet discarding timer fails to be transmitted locally.

Optionally, discarding the data packet corresponding to the packet discarding timer, if the packet discarding timer expires and it is detected that the data packet corresponding to the packet discarding timer fails to be transmitted locally comprises:

determining a current layer in which the data packet corresponding to the packet discarding timer is located, if the packet discarding timer expires and it is detected that the data packet corresponding to the packet discarding timer fails to be transmitted locally; and discarding the data packet corresponding to the packet discarding timer in the current layer.

Optionally, determining a current layer in which the data packet corresponding to the packet discarding timer is located comprises:

searching for the data packet corresponding to the packet discarding timer starting from the SDAP layer;

searching for the data packet corresponding to the packet discarding timer in a next layer subsequent to a layer that is searched, if no data packet corresponding to the packet discarding timer is found in the layer that is searched;

determining the layer that is searched as the current layer, if the data packet corresponding to the packet discarding timer is found in the layer that is searched; and determining the next layer as the current layer, if the data packet corresponding to the packet discarding timer is found in the next layer.

Optionally, the method further comprises:

transmitting data packet discarding information to the base station, wherein the data packet discarding information comprises an identification corresponding to the discarded data packet.

Optionally, before transmitting the data packet discarding information to the base station, the method further comprises:

determining, whenever a preset period of time passed by, an identification corresponding to a discarded data packet in the current period; and generating the data packet discarding information based on the identification corresponding to the discarded data packet.

Optionally, transmitting the data packet discarding information to the base station comprises:

adding the data packet discarding information to encapsulation of a target control message in a PDCP layer; and transmitting the target control message encapsulated with the data packet discarding information to the base station.

Figure 18:
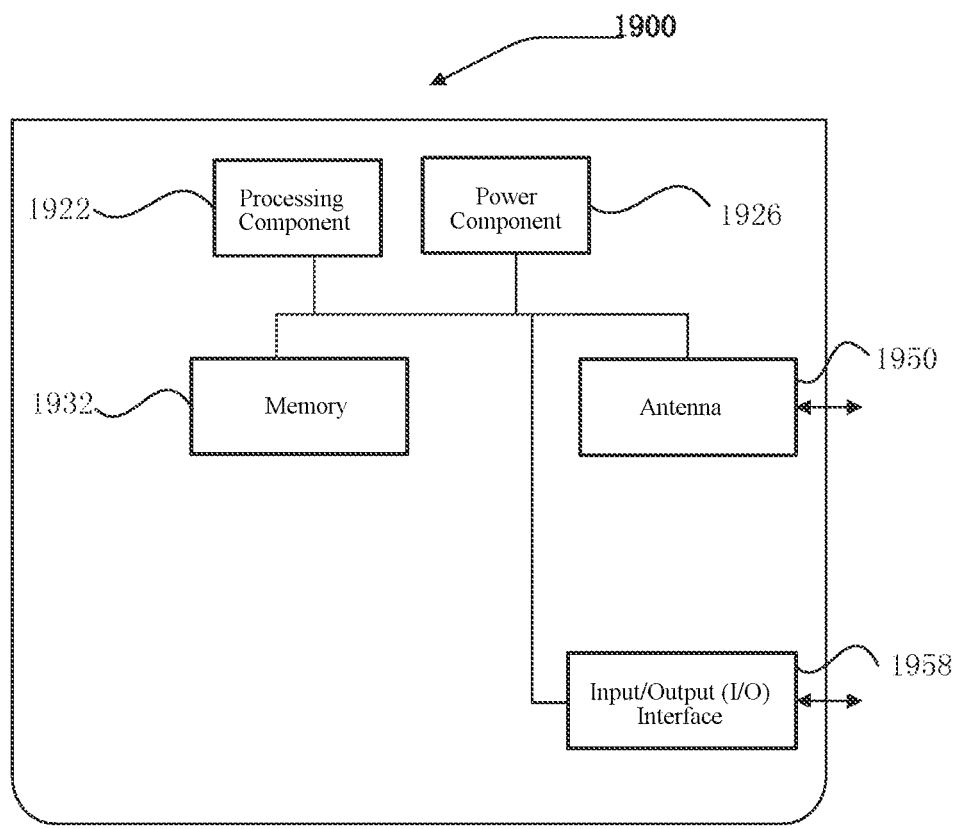
FIG. 18 is a block diagram of a base station according to an embodiment of the present disclosure.

FIG. 18 is a block diagram of a base station 1900 according to an exemplary embodiment. Referring to FIG. 18, the base station 1900 comprises a processing component 1922 that further comprises one or more processors, and memory resources represented by a memory 1932 for storing instructions executable by the processing component 1922, such as applications. The applications stored in the memory 1932 can comprise one or more modules each corresponding to a set of instructions. Further, the processing component 1922 is configured to execute the instructions to perform the above described method for discarding the data packet.

The base station 1900 can further comprise a power component 1926 configured to perform power management of the base station 1900, an antenna 1950 configured to connect the base station 1900 to a communication network, and an input/output (I/O) interface 1958.

The base station 1900 can comprise a memory and one or more programs stored in the memory, wherein the one or more programs are configured to be executed by one or more processors, and comprise instructions of performing operations of:

generating an instruction message, which instructs a terminal to start monitoring transmission timeout of a data packet in a SDAP layer; and transmitting the instruction message to the terminal.

Optionally, the method further comprises:

receiving a control message transmitted from the terminal, wherein the control message comprises data packet discarding information which comprises an identification corresponding to a discarded data packet; and when a lower boundary of a reordering window moves to a position corresponding to the data packet, moving the lower boundary down to a position corresponding to a next data packet subsequent to the data packet.

It should be understood by those skilled in the art that all or part of the steps of the above embodiments can be implemented through hardware, or through a program that instructs a related hardware. The program can be stored on a computer-readable storage medium which can be read-only memory, magnetic or optical disks.

The foregoing are only preferred embodiments of the disclosure, and do not intend to limit the disclosure. Any variation, equivalent substitution and modification that fall within the spirit and principle of the disclosure should be embraced by the protective scope of the disclosure.

What is claimed is:

1. A method for discarding a data packet, comprising:
receiving an instruction message sent from a base station, the instruction message instructing start of monitoring transmission timeout of a data packet in a Service Data Adaptation Protocol (SDAP) layer;
starting a packet discarding timer corresponding to each data packet in a data stream of a target session in the SDAP layer according to the instruction message, when it is detected that the target session is initiated;
discarding the data packet corresponding to a packet discarding timer, when the packet discarding timer expires and it is detected that the data packet corresponding to the packet discarding timer fails to be transmitted;
determining, whenever a preset period of time passed by, an identification corresponding to a discarded data packet in a current period, wherein the preset period of time is counted through a signaling timer;
generating data packet discarding information based on the identification corresponding to the discarded data packet; and
transmitting the data packet discarding information to the base station, wherein the data packet discarding information comprises the identification corresponding to the discarded data packet.

2. The method according to claim 1, wherein discarding the data packet corresponding to a packet discarding timer, when the packet discarding timer expires and it is detected that the data packet corresponding to the packet discarding timer fails to be transmitted comprises:
determining a current layer in which the data packet corresponding to the packet discarding timer is located, when the packet discarding timer expires and it is detected that the data packet corresponding to the packet discarding timer fails to be transmitted; and
discarding the data packet corresponding to the packet discarding timer in the current layer.

3. The method according to claim 2, wherein determining a current layer in which the data packet corresponding to the packet discarding timer is located comprises:
searching for the data packet corresponding to the packet discarding timer starting from the SDAP layer;
searching for the data packet corresponding to the packet discarding timer in a next layer subsequent to a layer that is searched, when no data packet corresponding to the packet discarding timer is found in the layer that is searched;
determining the layer that is searched as the current layer, when the data packet corresponding to the packet discarding timer is found in the layer that is searched; and
determining the next layer as the current layer, when the data packet corresponding to the packet discarding timer is found in the next layer.

4. The method according to claim 1, wherein transmitting the data packet discarding information to the base station comprises:
adding the data packet discarding information to encapsulation of a target control message in a Packet Data Convergence Protocol (PDCP) layer; and
transmitting the target control message encapsulated with the data packet discarding information to the base station.

5. A device for discarding a data packet, comprising:
a processor; and
a memory storing instructions executable by the processor;
wherein the processor is configured to:
receive an instruction message transmitted from a base station, the instruction message instructing start of monitoring transmission timeout of a data packet in a Service Data Adaptation Protocol (SDAP) layer;
start a packet discarding timer corresponding to each data packet in a data stream of a target session in the SDAP layer according to the instruction message, when it is detected that the target session is initiated;
discard the data packet corresponding to a packet discarding timer, when the packet discarding timer expires and it is detected that the data packet corresponding to the packet discarding timer fails to be transmitted;
determine, whenever a preset period of time passed by, an identification corresponding to a discarded data packet in a current period, wherein the preset period of time is counted through a signaling timer;
generate data packet discarding information based on the identification corresponding to the discarded data packet; and
transmit the data packet discarding information to the base station, wherein the data packet discarding information comprises the identification corresponding to the discarded data packet.

6. The device according to claim 5, wherein the processor is further configured to:
determine a current layer in which the data packet corresponding to the packet discarding timer is located, when the packet discarding timer expires and it is detected that the data packet corresponding to the packet discarding timer fails to be transmitted; and
discard the data packet corresponding to the packet discarding timer in the current layer.

7. The device according to claim 6, wherein the processor is further configured to:
search for the data packet corresponding to the packet discarding timer starting from the SDAP layer;

search for the data packet corresponding to the packet discarding timer in a next layer subsequent to a layer that is searched, when no data packet corresponding to the packet discarding timer is found in the layer that is searched;

determine the layer that is searched as the current layer, when the data packet corresponding to the packet discarding timer is found in the layer that is searched; and determine the next layer as the current layer, when the data packet corresponding to the packet discarding timer is found in the next layer.

8. The device according to claim 5, wherein the processor is further configured to:

add the data packet discarding information to encapsulation of a target control message in a Packet Data Convergence Protocol (PDCP) layer; and transmit the target control message encapsulated with the data packet discarding information to the base station.

* * * * *